(12) United States Patent
Ambrose

(10) Patent No.: US 11,518,549 B1
(45) Date of Patent: Dec. 6, 2022

(54) AUTONOMOUS SPACECRAFT PROPELLANT GAUGING

(71) Applicant: LOCKHEED MARTIN CORPORATION, Bethesda, MD (US)

(72) Inventor: Jay Harold Ambrose, Santa Cruz, CA (US)

(73) Assignee: LOCKHEED MARTIN CDRPORATION, Bethesda, MD (US)

( * ) Notice: Subject to any disclaimer, the term of this patent is extended or adjusted under 35 U.S.C. 154(b) by 651 days.

(21) Appl. No.: 16/560,840

(22) Filed: Sep. 4, 2019

(51) Int. Cl.
| | |
|---|---|
| *B64G 1/36* | (2006.01) |
| *B64G 1/40* | (2006.01) |
| *G01F 23/34* | (2006.01) |
| *G06N 20/00* | (2019.01) |
| *G01F 23/24* | (2006.01) |
| *B64G 1/24* | (2006.01) |

(52) U.S. Cl.
CPC ............. *B64G 1/36* (2013.01); *B64G 1/402* (2013.01); *G01F 23/246* (2013.01); *G06N 20/00* (2019.01); *B64G 2001/247* (2013.01)

(58) Field of Classification Search
USPC ...................................................... 244/171.1
See application file for complete search history.

(56) References Cited

U.S. PATENT DOCUMENTS

| | | | | |
|---|---|---|---|---|
| 2011/0071751 | A1* | 3/2011 | Benavides | G01S 15/88 701/124 |
| 2014/0365043 | A1* | 12/2014 | Vu | B64G 1/66 701/13 |
| 2017/0160120 | A1* | 6/2017 | Core | B64G 1/26 |
| 2017/0283094 | A1* | 10/2017 | Ho | B64G 1/242 |
| 2020/0377237 | A1* | 12/2020 | Hanson | B64G 1/402 |

* cited by examiner

*Primary Examiner* — Tyler D Paige
(74) *Attorney, Agent, or Firm* — Bakerhostetler

(57) ABSTRACT

An autonomous spacecraft propellant-gauging system, the system including a propellant tank, one or more heating devices, at least one temperature sensor and a processor. The heating devices are used to heat up the propellant tank, and the temperature sensors sense the temperature of the propellant content of the propellant tank. The processor controls operations of the heating devices and the temperature sensor. The processor further executes an algorithm to automate gauging of the propellant content of the propellant tank based on a reduced order model (ROM) and a number of parameters, and reports out an estimate of the mass of the remaining propellant of the propellant tank.

17 Claims, 4 Drawing Sheets

AUTONOMOUS SPACECRAFT PROPELLANT GAUGING

STATEMENT REGARDING FEDERALLY SPONSORED RESEARCH OR DEVELOPMENT

Not Applicable.

FIELD OF THE INVENTION

The present invention generally relates to spacecraft technology and, more particularly, to autonomous spacecraft propellant gauging.

BACKGROUND

Propellant gauging is needed to give mission operators accurate information regarding propellant (or fuel) remaining for station keeping and disposal burns. Gauging spacecraft (e.g., satellite) propellant, especially during the last stages of a mission, is a challenging process due to maneuvering of the spacecraft and lack of gravity. In an automobile, for example, the fuel is held in the bottom of the fuel tank due to the gravity, which allows fuel-level measurement. For a spacecraft traveling in space, however, the propellant gauging is significantly more complicated. The existing propellant-gauging system (PGS) techniques are mostly thermal capacitance-based or pressure-volume-temperature-based gauging techniques.

Currently, the thermal-capacitance-based PGS technique involves comparing on-orbit thermal measurements to detailed thermal models of the fuel tank (containing differing amounts of fuel) to estimate the current remaining fuel. The accuracy of such estimates, however, is not quantified. In order to quantify the PGS uncertainty, a statistical approach has been developed that can simultaneously vary 8-10 uncertain PGS model parameters, fit the results to the PGS model and produce fuel mass uncertainty estimates. The uncertainty quantification work only allowed a somewhat rigorous estimate of the remaining-fuel uncertainty when using the heritage PGS approach for a specific platform.

SUMMARY

According to various aspects of the subject technology, methods and configuration for providing an autonomous spacecraft propellant gauging system (PGS) are disclosed. The subject technology utilizes a reduced order model (ROM) and implements machine-learning techniques to provide a compact ROM of the observed profiles. The provided ROM captures important parameters to accurately estimate temperature response at any time during the mission, but especially near the end of the life of the mission.

In one or more aspects, an autonomous spacecraft PGS includes a propellant tank, one or more heating devices, at least one temperature sensor and a processor. The heating devices are used to heat up the propellant tank, and the temperature sensors sense the temperature of propellant content of the propellant tank. The processor controls operations of the heating devices and the temperature sensors. The processor further executes an algorithm to automate gauging of the propellant content of the propellant tank based on a reduced order model (ROM) and a number of parameters, and reports out an estimate of a mass of remaining propellant in the propellant tank.

In other aspects, a method of automatic propellant gauging of a space vehicle includes heating up a propellant tank including propellant content, and measuring the temperature of the propellant content by using at least one temperature sensor. The method further includes executing, by a processor, an algorithm to automate gauging of the propellant content based on a reduced order model (ROM) and a plurality of parameters and reporting out an estimate of a mass of the remaining propellant in the propellant tank.

In yet other aspects, a space vehicle includes a propellant tank, one or more heating elements, at least one temperature sensor and a processor. The propellant tank includes a number of vanes and contains a propellant and a pressurant gas. The heating elements are used to heat up the propellant tank, and the temperature sensors measure the temperature of propellant content of the propellant tank. The processor controls operations of the heating elements and the temperature sensors and executes an algorithm to automate gauging of the propellant content of the propellant tank based on a reduced order model (ROM) and a number of parameters. The processor further reports out an estimate of a mass of the remaining propellant in the propellant tank with a respective uncertainty and a respective confidence level.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
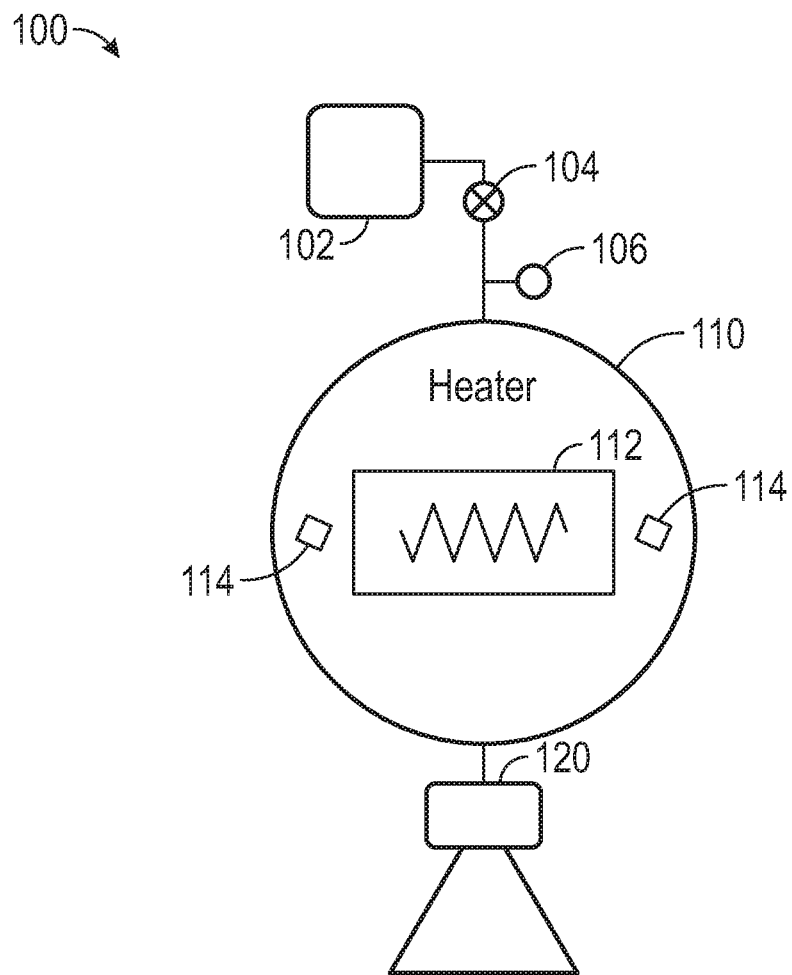
FIG. 1 is a schematic diagram illustrating an example of a simplified propulsion system, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configuration are disclosed for providing an autonomous spacecraft propellant gauging technique. The subject technology is based on a reduced order model (ROM) to capture important parameters to accurately estimate fuel tank temperature response at any time during the mission, but especially near the end of life of the mission. The disclosed solution implements machine learning techniques to provide a compact ROM of the observed profiles. Currently, the most accurate existing method for estimating the remaining propellant in a spacecraft tank is based on thermal measurements. For these thermal measurements, the fuel tank(s) are heated and/or cooled and the remaining mass of propellant is estimated from the transient temperature profile. The ROM can be trained based on results of a detailed physics-based model and/or measured data from propellant measurements. In the case of measured data, the uncertainty in remaining fuel can be based on 'backwards bookkeeping' from an observed full depletion of the fuel at the end of life. The accuracy of the estimates is quantified as part of the ROM training process, based on assigned uncertainties of the key parameters. The remaining propellant estimation can be automatically determined on a regular basis. This may or may not require the programmed heating/cooling cycles normally used. Estimates could be based on naturally occurring diurnal or seasonal thermal cycles or pre-programmed thermostatically controlled cycles.

Currently, there are two primary methods for estimating the remaining fuel in a spacecraft tank. The thermal method that the subject solution improves upon uses post-measurement comparisons to a specialized detailed model of the system. A second method uses the fuel-tank pressure, measured using high-accuracy pressure transducers, along with the fuel-tank volume, temperature and content to estimate remaining propellant. This method is not as accurate as the thermal gauging due to uncertainties in pressurant quantity, pressure transducer drift and tank stretch. The method also requires the use of higher-cost, high-accuracy pressure transducers and/or readout systems.

One of the advantageous features of the proposed solution is that it does not require any additional equipment and can potentially use low-cost heaters and/or sensors already installed for thermal control of the fuel tank. Further, the compact nature of the employed ROM is expected to allow working with minimal additional processing and memory resources on the spacecraft. The physics-based model for the spacecraft can be trained and reused for similar spacecraft with minimal updates.

FIG. 1 is a schematic diagram illustrating an example of a simplified propulsion system 100, according to certain aspects of the disclosure. The propulsion system 100 includes a pressure tank 102 including a gas (e.g., helium) under pressure, a valve 104, a pressure gauge 106, a propellant (also referred to as fuel) tank 110, a heater 112, one or more temperature sensors 114 and a thruster 120. A bi-propellant system may also have an oxidizer tank, which is not shown herein for simplicity. The propellant tank 110 includes a propellant such as hydrazine that is stored as a liquid for mass efficiency. The hydrazine may be combined with an oxidizer such as nitrogen tetroxide. The pressure tank 102 can control an internal pressure of the propellant tank 110. The valve 104 can isolate the pressure tank 102 from the propellant tank 110, and the pressure gauge 106 can measure the pressure level inside the propellant tank 110. The heater 112 can be an electrical heater that is, for example, wrapped around the propellant tank 110 and can be operated to heat the content of the propellant tank 110. The temperature sensors 114 can be disposed at a number of locations on the propellant tank 110 to measure respective local temperatures. The valve 104, the heater 112 and the temperature sensors 114 can be controlled by a controller, such as the processor of an electronic system onboard the space vehicle.

For a space vehicle (e.g., a satellite) launched for a mission, it is crucial to know the amount (mass) of the propellant in the propellant tank 110, especially near the end of the life of the propellant, when the decision for ending the mission and deorbiting (pushing to a higher orbit) the satellite is to be made. Deorbiting the satellite may require a specific amount of propellant (e.g., about 4% of the beginning of life) for disposal burn, and the operators need to know the amount of remaining propellant in the propellant tank 110 with a good accuracy. Currently bookkeeping approaches are used to estimate the mass of the remaining fuel. In the bookkeeping approach, a technician may estimate the mass of the remaining fuel by using a thermal propellant-gauging technique and fitting heating and cooling parameters of the propellant into some fuel temperature characteristic models.

The thermal propellant-gauging technique involves heating and cooling the propellant tank 110 and measuring the temperature response using the temperature sensors 114. The mass of remaining propellant can be inferred from the measured temperature response by comparing it to detailed thermal model predictions. There are a number of uncertainties in the estimation process. For example, the temperature measurement itself has an uncertainty, and there is uncertainty in conductive and radiative thermal coupling between the tank and its environment. Further, there is uncertainty in the propellant's, pressurant's (for liquid-plus-gas systems) and tank's physical properties. Also, there are uncertainties in the Marangoni convective contribution (for liquid-plus-gas systems) to the internal tank heat transfer and in the tank's thermal environment. The Marangoni convective contribution is due to the Marangoni effect (also called the Gibbs—Marangoni effect), which is the result of the mass transfer along an interface between two fluids due to a gradient of the surface tension.

The subject disclosure describes a propellant-gauging system (PGS) that can automate the process of estimation of the mass of the remaining propellant. For example, the automatic process may include periodic (e.g., every few months) heating and cooling of the propellant tank 110 and measuring the propellant temperatures. The measured temperatures can then be used in an equation provided by the subject technology to provide an estimate of the mass of the remaining propellant.

Figure 2:
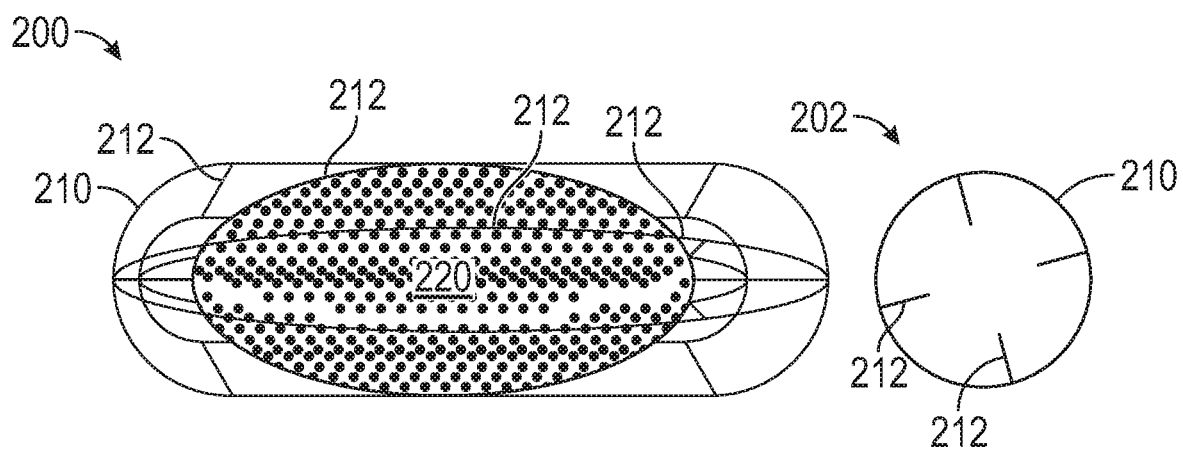
FIG. 2 is a schematic diagram illustrating an example propellant tank with a predicted model of fuel and pressurant inside the propellant tank, according to certain aspects of the disclosure.

FIG. 2 is a schematic diagram illustrating an example propellant tank 210 with a predicted model of fuel and pressurant inside the propellant tank 210, according to certain aspects of the disclosure. Unlike terrestrial vehicle fuel tanks, in which the fuel can be extracted from the tank using gravity, in space vehicles such as satellites, in order to extract the liquid to the thrusters, a propellant-management device may be used to orient a gas (ullage, e.g., helium) and liquid propellant in a microgravity situation. One such system may use thin vanes 212, as shown in the interior of the propellant tank 210 to force the ullage surface to the center. A predicted configuration for the interface between liquid and ullage for a specific propellant quantity is shown in FIG. 2. The shape of the propellant 220 is driven primarily by capillary forces. In some implementations, a sump with smaller voids can be placed at the tank outlet to ensure that liquid preferentially wets the outlet to supply the thruster. A cross-sectional view 202 at the center of the propellant tank 210 shows thin vanes 212 at four sides of the interior of the propellant tank 210. The ullage size and shape in the propellant tank 210 is predicted by an interactive computer program, such as Surface Evolver, that can predict surfaces shaped by surface tension and other energies.

Figure 3:
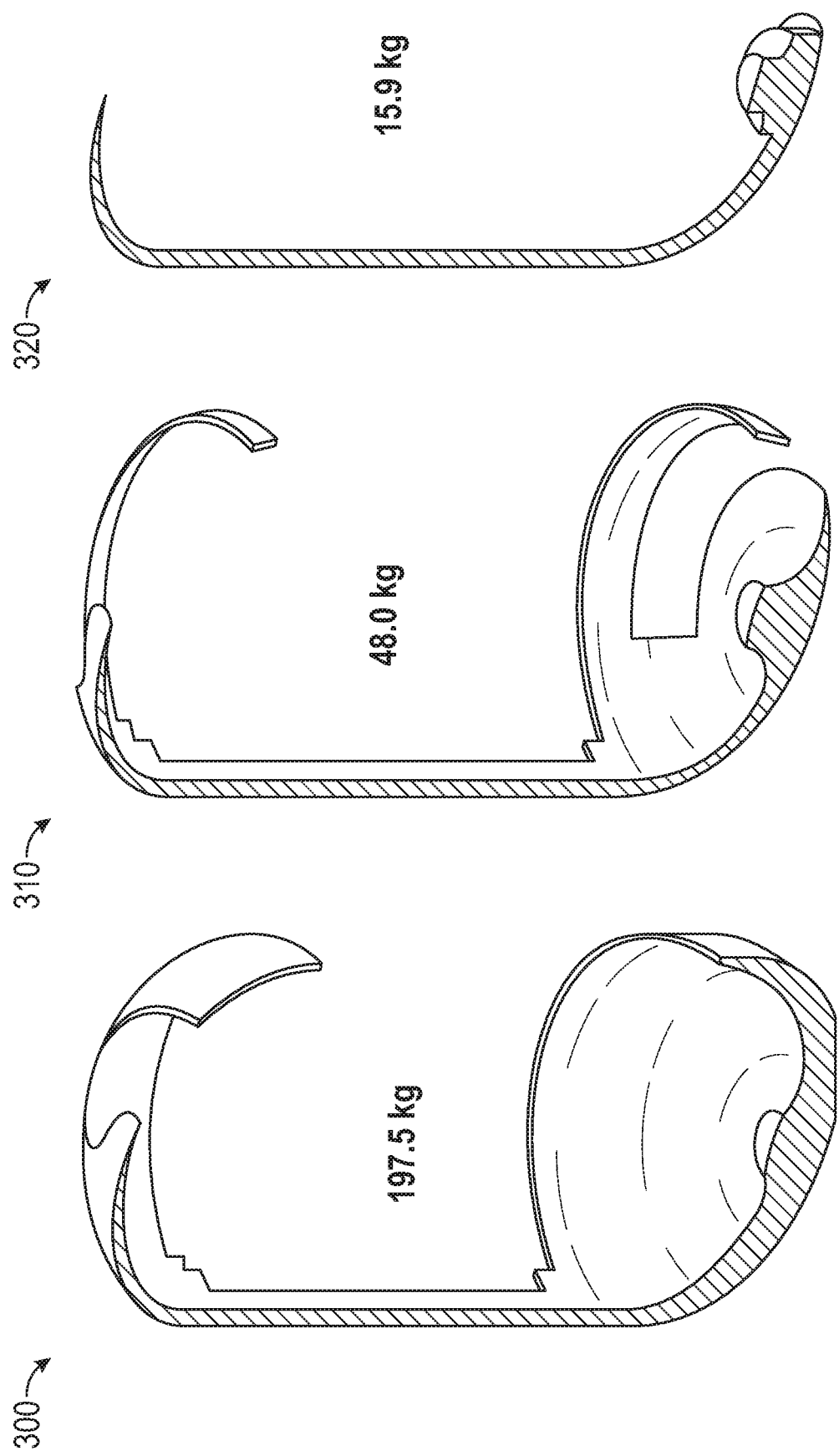
FIG. 3 is a schematic diagram illustrating examples of fuel meshes used in a thermal model of propellant-free surfaces, according to certain aspects of the disclosure.

FIG. 3 is a schematic diagram illustrating examples of fuel meshes used in a thermal model of propellant-free surfaces, according to certain aspects of the disclosure. As described above, the prior PGS measurements involved comparing on-orbit thermal measurements to detailed thermal models (containing differing amounts of fuel) to estimate the current remaining fuel, without having a quantified uncertainty of the estimate. In order to quantify the PGS uncertainty, a statistical analysis can be used to simultaneously vary a number of (e.g., eight to ten) uncertain PGS model parameters. The results of the statistical analysis can then be fitted to a model (e.g., a ROM) to produce mass uncertainty estimates. The uncertainty quantification allows a somewhat rigorous estimate of the remaining fuel uncertainty when using the heritage PGS approach. The fuel meshes 300, 310 and 320 shown in FIG. 3 are derived from the Surface Evolver models of the propellant-free surfaces of a propellant tank. The propellant-free surfaces depicted by the meshes 300, 310 and 320 represent a theoretical prediction (busing a physics-based simulation) of the behavior in the space of the propellant surface inside a propellant tank as a function of the amount of propellant left in the tanks. For example, the fuel meshes 300, 310 and 320 correspond to remaining propellant masses of 197.5 kg, 48.0 kg and 15.9 kg. The white strap represents nonexistence of any propellant.

Figure 4:
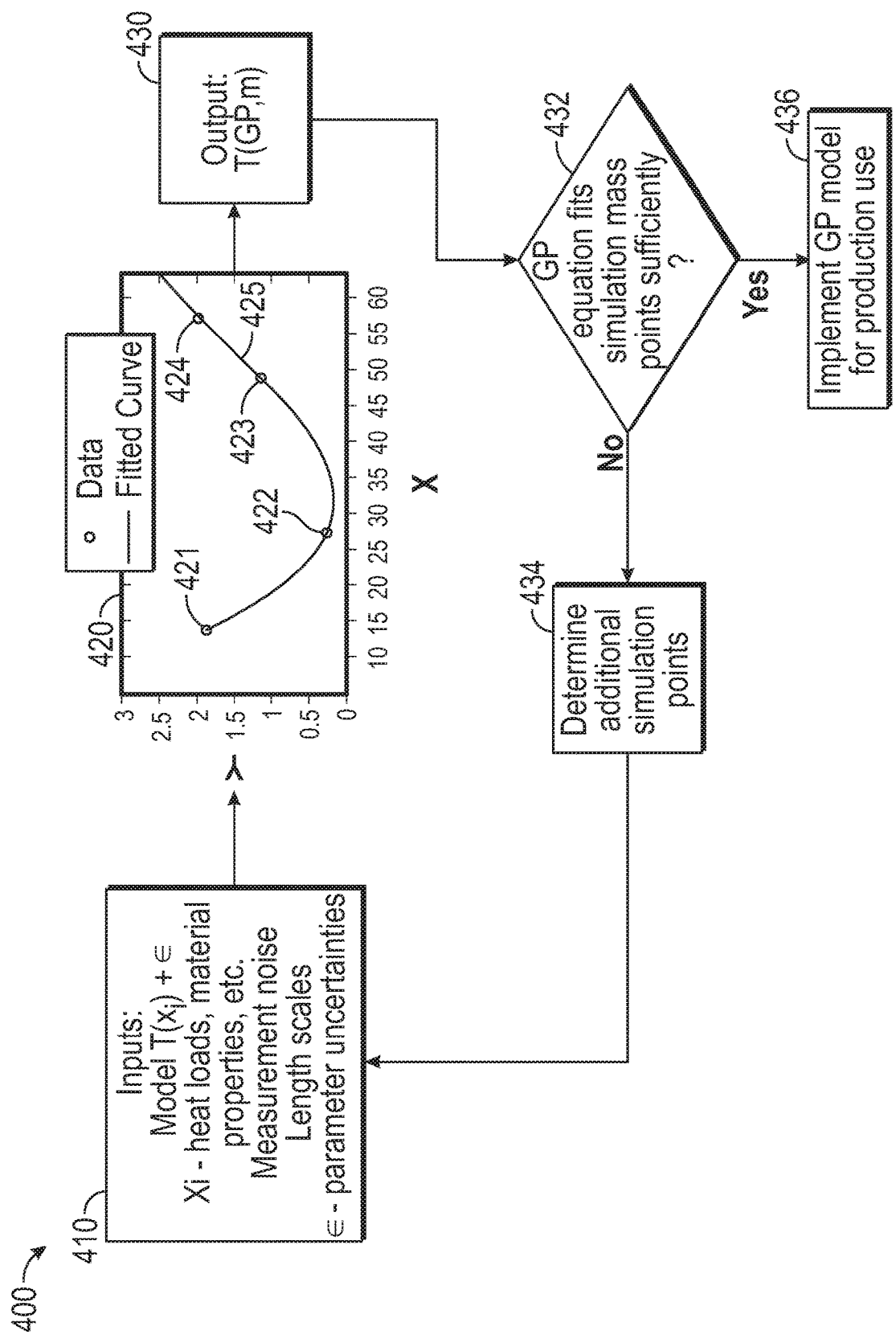
FIG. 4 is a flow diagram illustrating an example method of training a reduced order model, according to certain aspects of the disclosure.

FIG. 4 is a flow diagram illustrating an example method 400 of training a ROM, according to certain aspects of the disclosure. ROMs are produced based on both measured and simulated data using a Gaussian Process (GP) approach, and lend themselves well to smoothly varying functions such as thermal measurements. The method 400 of training the ROM can be programmed in the processor of a space vehicle (e.g., satellite) as part of an onboard PGS-simulation tool. The ROM allows simulation of the PGS measurement using a minimal number of parameters of interest. The accuracy can be improved by limiting the sessions at which measurements are made and scheduling measurements at fixed local times. The space vehicle PGS can be programmed to periodically activate fuel tank heaters using a standard PGS technique that is set point-controlled for one or more heating cycles (e.g., heating and subsequently cooling). Resulting temperature profiles can be compared to those for known fuel increments and based on the fit to obtain an estimated fuel quantity.

A Monte Carlo approach can be used to train the GP to the points of interest, allowing an accurate simulation for unknown points. The GP development is a natural extension of the prior work for uncertainty quantification for PGS, as the GP is trained using the detailed thermal model based on the specific vehicle and can include space vehicle thermal-vacuum mode correlation and other unique parameters.

As discussed above, there are a number of uncertainties in the remaining propellant-mass estimation process based on the thermal propellant-gauging technique. For example, the temperature measurement itself has an uncertainty, and there is uncertainty in conductive and radiative thermal coupling between the tank and its environment. Further, there is uncertainty in the propellant's, pressurant's (for liquid-plus-gas systems) and tank's physical properties. Also, there are uncertainties in the Marangoni convective contribution (for liquid-plus-gas systems) to the internal tank heat transfer and in the tank's thermal environment. The techniques of the subject technology that are applied to quantify uncertainty are similar techniques that are being used to provide ROMs for machine learning and artificial intelligence.

The method 400 of training the ROM provides quantified uncertainty associated with the ROM, and is based on a number of input parameters ($X_i$) that are used, at operation block 410, in a simulation run. The parameters $X_i$ may include, for example, temperature, heat loads, material properties and other design-related parameters that can be derived from the space vehicle design specifications. The ROM is trained using a large number of a correctly selected variation of parameters in a statistical approach (e.g., a Monte Carlo process), in order to statistically validate the uncertainties ($\varepsilon$) with specific levels of confidence. The Monte Carlo approach allows simultaneously varying a number of parameters so that an accurate model can be obtained without many analysis simulations. Fitting of the ROM model to predicted data points is shown in the chart 420. The chart 420 depicts variation of Y, which is a self-predicted variation, versus X, which is a parameter such as temperature. In the chart 420, the curve 425 shows a plot of an equation representing a GP model in one dimension (with a single parameter such as temperature), which is a simplified version of a multidimensional problem with multiple parameters. The dots 421, 422, 423 and 424 correspond to predicted data (mass data) points resulting from the simulation. The mass data points represent the mass values of the remaining propellant in the propellant tank.

At an operation block 430, the result of fitting of the output of the training, which is the GP model represented by an equation (e.g., T(GP, m)), is obtained. At operation block 432, if the fit is not acceptable, at operation block 434, additional simulation (predicted) data points are added and control is passed to operation block 410 for performing the required simulations. The goodness of the fit may be determined, for example, by a known chi-square method. If at operation block 432, it is determined that the GP equation is a good fit to the mass data points, for example, the fit goodness exceeds a threshold value, and the control is passed to operation block 436, where the GP equation is the trained ROM used for production use. To summarize the method, the ROM is matched to the simulation over a range of parameters of interest within the required accuracy, and then the model is used for the system to predict mass of the remaining propellant in the propellant tank. In some implementations, the trained ROM (the final equation) can be saved into an onboard processing unit (e.g., a general-purpose processor). The processor automatically reports out the remaining propellant mass instead of reporting out on temperature variations. For example, the space vehicle may be programed to periodically (e.g., every three months or six months) perform the thermal measurements. The measured temperature values are then automatically translated, by using the trained ROM, to propellant mass values with specific uncertainties at certain confidence levels. It is understood that in the above discussed methods, the ROM is trained for a specific space vehicle in a specific mission.

The above discussed method further allows comparing different heater and sensor configurations and arrives at an optimized configuration by identifying the configuration that results in the best fitted model.

Figure 5:
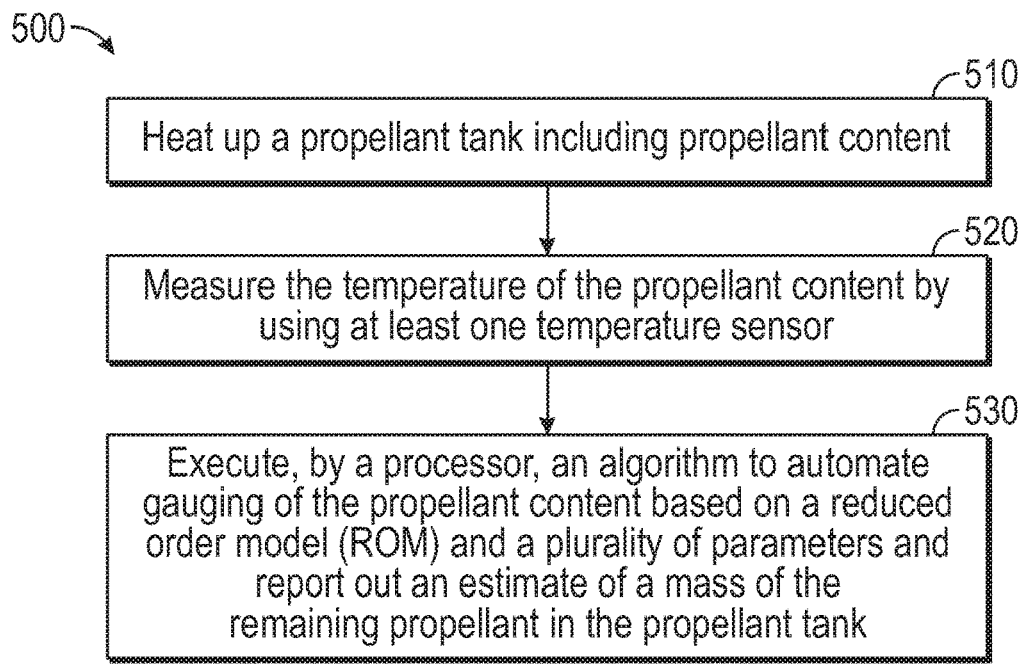
FIG. 5 is a flow diagram illustrating an example method of training a reduced order model, according to certain aspects of the disclosure.

FIG. 5 is a flow diagram illustrating an example method 500 of training a ROM, according to certain aspects of the disclosure. The method 500 includes heating up (e.g., using 112 of FIG. 1) a propellant tank (e.g., 110 of FIG. 1) including propellant content (510), and measuring the temperature of the propellant content by using at least one temperature sensor (e.g., 114 of FIG. 1) (520). The method further includes executing, by a processor (e.g., 612 of FIG. 6), an algorithm (e.g., as described in of FIG. 4) to automate gauging of the propellant content based on a reduced order model (ROM) and a plurality of parameters and reporting out an estimate of a mass of the remaining propellant in the propellant tank (530).

Figure 6:
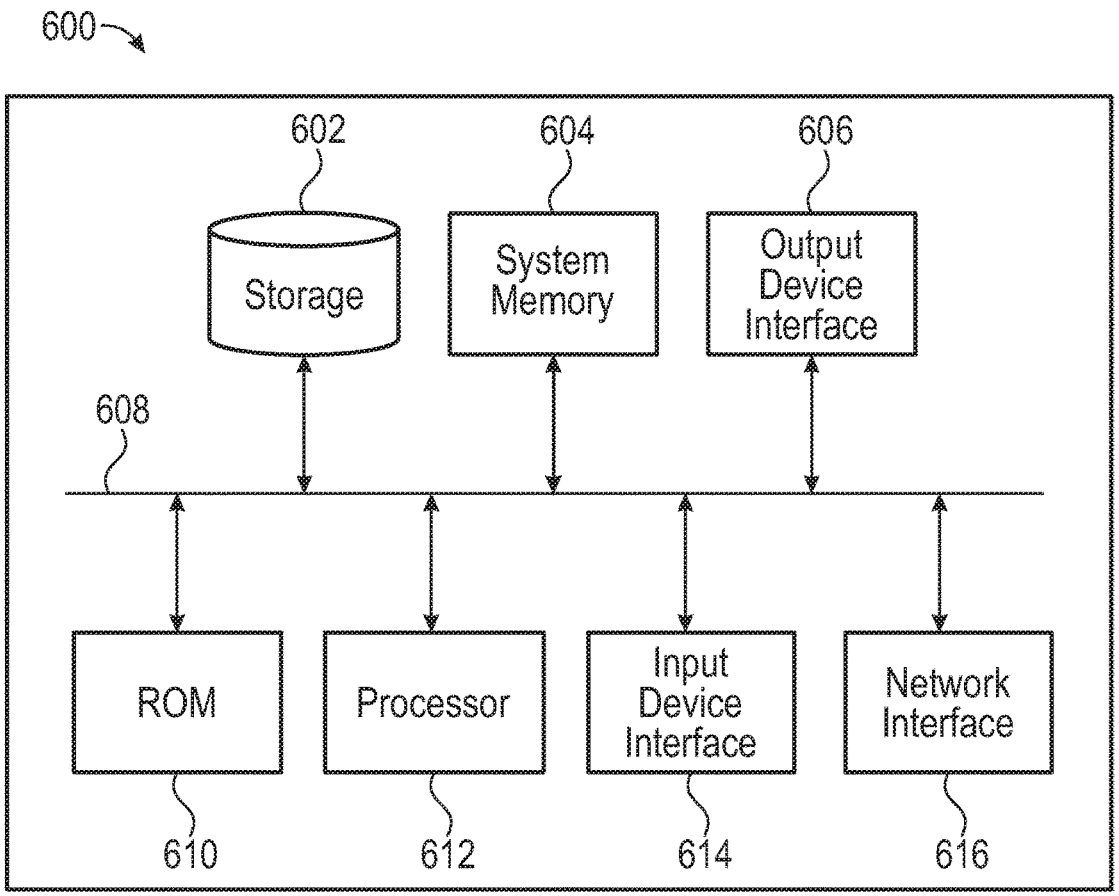
FIG. 6 conceptually illustrates an electronic system with which some aspects of the subject technology are implemented.

FIG. 6 conceptually illustrates an electronic system with which some aspects of the subject technology are implemented. Electronic system 600, for example, can be a desktop computer, a laptop computer, a tablet computer, a server, a switch, a router, a base station, a receiver, a phone, a personal digital assistant, any device that can control and/or perform processing of data including aggregation of data, or generally any electronic device that transmits signals over a network. Such an electronic system includes various types of computer-readable media and interfaces for various other types of computer-readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieve(s) instructions to execute and data to process in order to execute the processes of the subject disclosure. The processing unit(s) 612 can be a single processor or a multicore processor in different implementations.

ROM 610 stores static data and instructions that are needed by processing unit(s) 612 and other modules of the electronic system. Permanent storage device 602, on the other hand, is a read-and-write memory device. This device is a nonvolatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk or flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory (RAM). System memory 604 stores any of the instructions and data that processing unit(s) 612 need(s) at runtime. In one or more implementations, the processes of the subject disclosure, for example, the trained ROM, are stored in system memory 604, permanent storage device 602, and/or ROM 610. From these various memory units, processing unit(s) 612 retrieve(s) instructions to execute and data to process in order to execute the processes of one or more implementations. In one or more implementations, the processing unit(s) 612 execute(s) the automatic processes of the subject technology, including performing heating and cooling cycles of the propellant tank, propellant temperature measurements, fitting of the ROM to the predicted mass data points, and providing a mass value of the remaining propellant with a specific uncertainty and at a certain confidence level based on thermal measurement results.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices such as a liquid crystal display (LCD), a light emitting diode (LED) display, an organic light emitting diode (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network (LAN), a wide area network (WAN), or an Intranet, or a network of networks, such as the Internet). Any or all components of electronic system 600 can be used in conjunction with the subject disclosure.

In some aspects, the subject technology is related to photonic integrated circuits, and more particularly, to a coherent optical system such as a lidar, with an architecture that incorporates optical amplifiers in the transmit/receive path. In some aspects, the subject technology may be used in various markets, including, for example, and without limitation, sensor technology, next-generation electronics, and electronic markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. An autonomous space propellant gauging system, the system comprising:
    a propellant tank;
    one or more heating devices configured to heat up the propellant tank;
    at least one temperature sensor configured to sense a temperature of propellant content of the propellant tank;
    a display; and
    a processor configured to:
        control operations of the one or more heating devices and the at least one temperature sensor;
        execute an algorithm to automate gauging of the propellant content of the propellant tank based on a reduced order model (ROM) and a plurality of parameters, wherein the ROM is derived from a detailed physics-based model by a Gaussian process, and wherein the algorithm is a machine-learning based algorithm and is used for training the ROM; and
        operate the display to report out an estimate of a mass of a remaining propellant of the propellant tank.

2. The system of claim 1, wherein the processor is configured to statistically link an accuracy of the estimate to the ROM and temperature measurements received from the at least one temperature sensor.

3. The system of claim 1, wherein the processor is configured to fit a multidimensional curve to simulated data points and to determine a goodness of the fit.

4. The system of claim 3, wherein the processor is configured to cause further simulations to obtain a larger set of simulated data points to improve the determined goodness of the fit, when the goodness of the fit is below a threshold.

5. The system of claim 1, wherein the processor is configured to report out the estimate of the mass of the remaining propellant of the propellant tank periodically.

6. The system of claim 1, wherein the processor is configured to report out the estimate of the mass of the remaining propellant of the propellant tank with a respective uncertainty and a respective confidence level.

7. The system of claim 1, wherein the plurality of parameters includes the measured temperature of the propellant content of the propellant tank and a heat load and material properties and other design-related parameters of the propellant tank and a space vehicle.

8. The system of claim 1, wherein the processor comprises a processor onboard a host spacecraft including the propellant tank.

9. The system of claim 1, wherein the heating device comprises electrical heaters wrapped around at least a portion of the propellant tank.

10. A method of automatic propellant gauging of a space vehicle, the method comprising:
    heating up a propellant tank including propellant content;
    measuring a temperature of the propellant content by using at least one temperature sensor; and
    deriving a reduced order model (ROM) from a detailed physics-based model by a Gaussian process, and wherein the algorithm is a machine-learning-based algorithm and is used for training the ROM;
    executing, by a processor, an algorithm to automate gauging of the propellant content based on the ROM and a plurality of parameters; and
    operating a display to report out an estimate of a mass of a remaining propellant of the propellant tank.

11. The method of claim 10, further comprising statistically linking an accuracy of the estimate to the ROM and temperature measurements received from the at least one temperature sensor.

12. The method of claim 10, further comprising fitting a multidimensional curve to simulated data points and to determine a fit goodness, and causing further simulations to obtain a larger set of simulated data points to improve the determined fit goodness, when the fit goodness is below a threshold.

13. The method of claim 10, further comprising reporting out the estimate of the mass of the remaining propellant of the propellant tank with a respective uncertainty and a respective confidence level.

14. The method of claim 10, wherein the plurality of parameters include the measured temperature of the propellant content of the propellant tank and a heat load and material properties and other design-related parameters of the propellant tank and the space vehicle.

15. A space vehicle comprising:
- a propellant tank including a plurality of vanes containing a propellant and a pressurant gas;
- one or more heating elements configured to heat up the propellant tank;
- at least one temperature sensor configured to measure a temperature of propellant content of the propellant tank;
- a display; and
- a processor configured to:
  - control operations of the one or more heating elements and the at least one temperature sensor;
  - execute an algorithm to automate gauging of the propellant content of the propellant tank based on a reduced order model (ROM) and a plurality of parameters, wherein the ROM is derived from a detailed physics-based model by a Gaussian process, and wherein the algorithm is a machine-learning-based algorithm and is used for training the ROM; and
  - operate the display to report out an estimate of a mass of a remaining propellant of the propellant tank with a respective uncertainty and a respective confidence level.

16. The space vehicle of claim 15, wherein the processor is further configured to fit a multidimensional curve to simulated data points and to determine a fit goodness, and to cause further simulations to obtain a larger set of simulated data points to improve the determined fit goodness, when the fit goodness is below a threshold.

17. The space vehicle of claim 15, wherein the plurality of parameters include the measured temperature of the propellant content of the propellant tank and a heat load and material properties and other design-related parameters of the propellant tank and the space vehicle.

* * * * *